US012573131B2

(12) United States Patent
Yi et al.

(10) Patent No.: US 12,573,131 B2
(45) Date of Patent: Mar. 10, 2026

---

(54) IMAGE PROCESSING METHOD, IMAGE PROCESSING APPARATUS, AND NON-TRANSITORY COMPUTER-READABLE RECORDING MEDIUM

(71) Applicants: Hong Yi, Beijing (CN); Haijing Jia, Beijing (CN); Hengzhi Zhang, Beijing (CN); Liyan Liu, Beijing (CN); Weitao Gong, Beijing (CN)

(72) Inventors: Hong Yi, Beijing (CN); Haijing Jia, Beijing (CN); Hengzhi Zhang, Beijing (CN); Liyan Liu, Beijing (CN); Weitao Gong, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 116 days.

(21) Appl. No.: 18/592,689

(22) Filed: Mar. 1, 2024

(65) Prior Publication Data

US 2024/0303909 A1 Sep. 12, 2024

(30) Foreign Application Priority Data

Mar. 9, 2023 (CN) .......................... 202310257616.6

(51) Int. Cl.
| | |
|---|---|
| *G06T 15/10* | (2011.01) |
| *G06T 7/13* | (2017.01) |
| *G06T 7/62* | (2017.01) |
| *G06T 7/73* | (2017.01) |
| *G06T 11/00* | (2006.01) |
| *G06V 20/64* | (2022.01) |

(52) U.S. Cl.
CPC ............... *G06T 15/10* (2013.01); *G06T 7/13* (2017.01); *G06T 7/62* (2017.01); *G06T 7/73* (2017.01); *G06T 11/00* (2013.01); *G06V*

*20/647* (2022.01); *G06T 2207/20081* (2013.01); *G06T 2207/20084* (2013.01)

(58) Field of Classification Search
CPC .. G06T 15/10; G06T 7/13; G06T 7/62; G06T 7/73; G06T 11/00; G06T 2207/20081; G06T 2207/20084; G06T 2210/04; G06T 19/00; G06T 19/006; G06T 2200/04; G06T 2219/004; G06V 20/647; G06V 10/82
USPC ......................................................... 345/419
See application file for complete search history.

(56) References Cited

U.S. PATENT DOCUMENTS

| | | | | |
|---|---|---|---|---|
| 8,994,726 B1 * | 3/2015 | Furukawa | ............... | G06T 17/10 |
| | | | | 345/420 |
| 9,230,366 B1 * | 1/2016 | McClendon | ............ | G06T 17/05 |
| 2019/0035100 A1 * | 1/2019 | Ebrahimi Afrouzi | .. | G06N 3/045 |
| 2020/0364929 A1 * | 11/2020 | Li | ............................ | G06T 7/62 |
| 2022/0114291 A1 * | 4/2022 | Li | ........................... | G06T 19/00 |
| 2024/0029352 A1 * | 1/2024 | Wan | .......................... | G06T 7/12 |

* cited by examiner

*Primary Examiner* — David T Welch
(74) *Attorney, Agent, or Firm* — IPUSA, PLLC

(57) ABSTRACT

An image processing method and an image processing apparatus are provided. The image processing method includes obtaining a panoramic image to which a room corresponds; performing door detection on the panoramic image to determine first information related to at least one door in the room; and displaying, based on the first information, a panoramic identifier of the at least one door in the panoramic image, the panoramic identifier indicating at least a door outline, a door type and an opening type of the door.

12 Claims, 10 Drawing Sheets

FIG.1

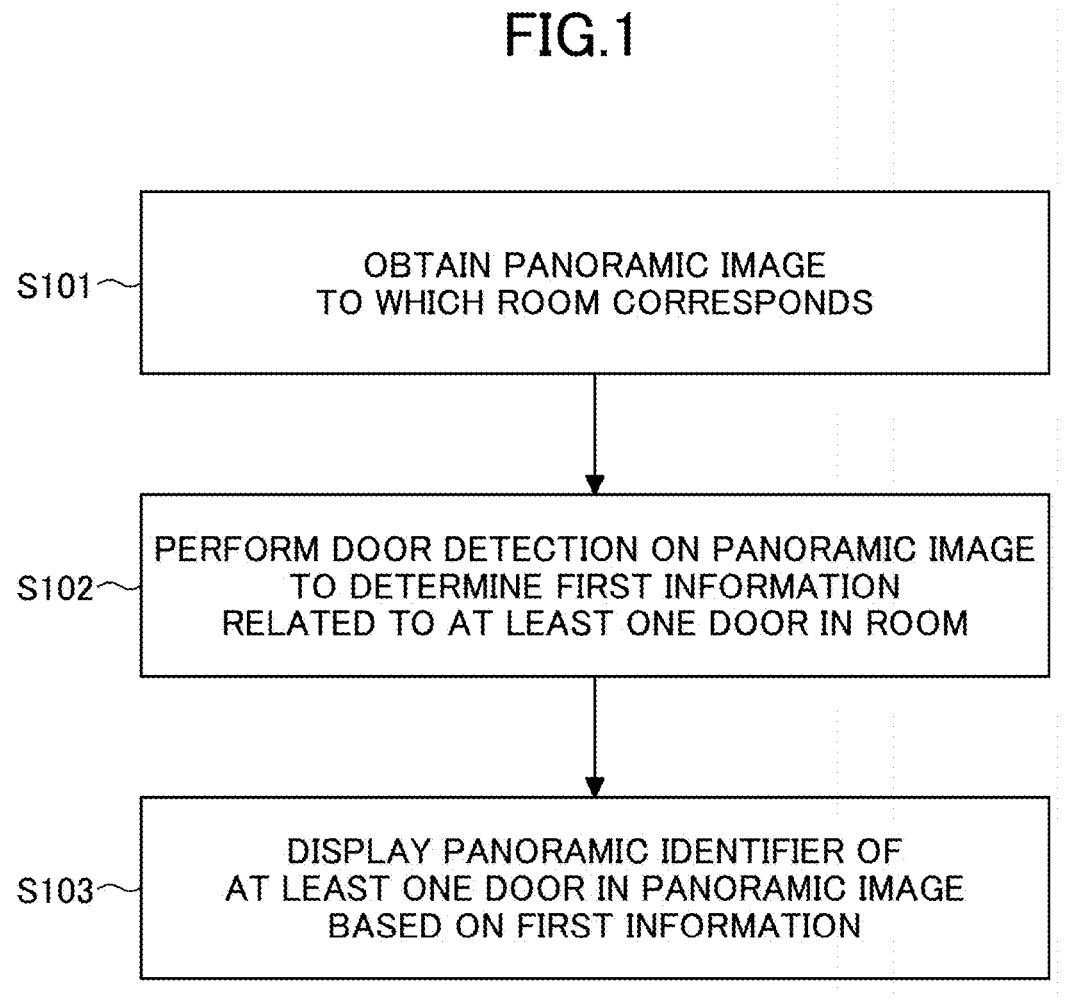

S101 — OBTAIN PANORAMIC IMAGE
TO WHICH ROOM CORRESPONDS

S102 — PERFORM DOOR DETECTION ON PANORAMIC IMAGE
TO DETERMINE FIRST INFORMATION
RELATED TO AT LEAST ONE DOOR IN ROOM

S103 — DISPLAY PANORAMIC IDENTIFIER OF
AT LEAST ONE DOOR IN PANORAMIC IMAGE
BASED ON FIRST INFORMATION

FIG.4

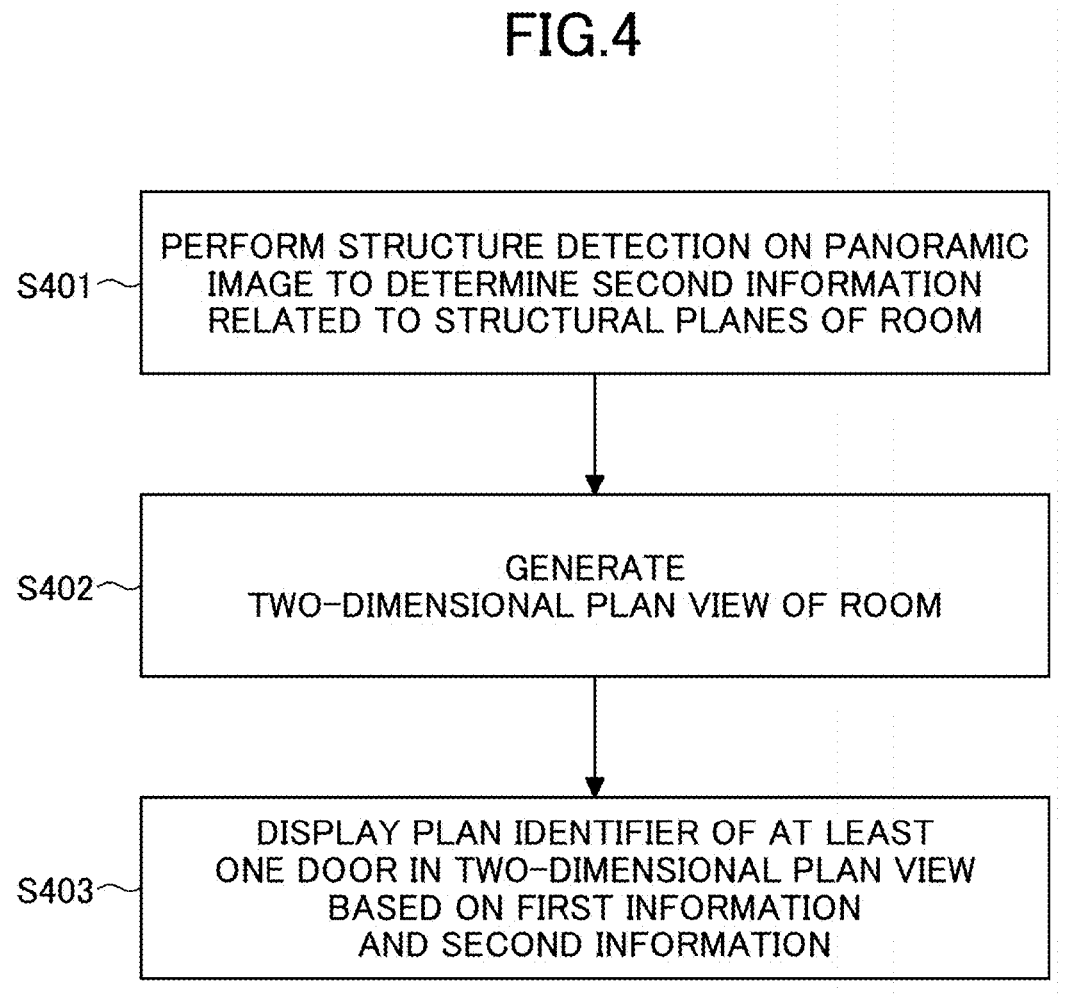

S401 — | PERFORM STRUCTURE DETECTION ON PANORAMIC IMAGE TO DETERMINE SECOND INFORMATION RELATED TO STRUCTURAL PLANES OF ROOM |

S402 — | GENERATE TWO-DIMENSIONAL PLAN VIEW OF ROOM |

S403 — | DISPLAY PLAN IDENTIFIER OF AT LEAST ONE DOOR IN TWO-DIMENSIONAL PLAN VIEW BASED ON FIRST INFORMATION AND SECOND INFORMATION |

FIG.6
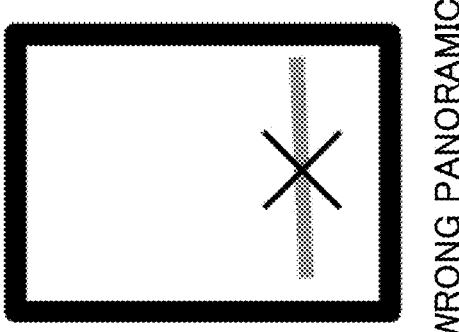
WRONG PANORAMIC IDENTIFIER
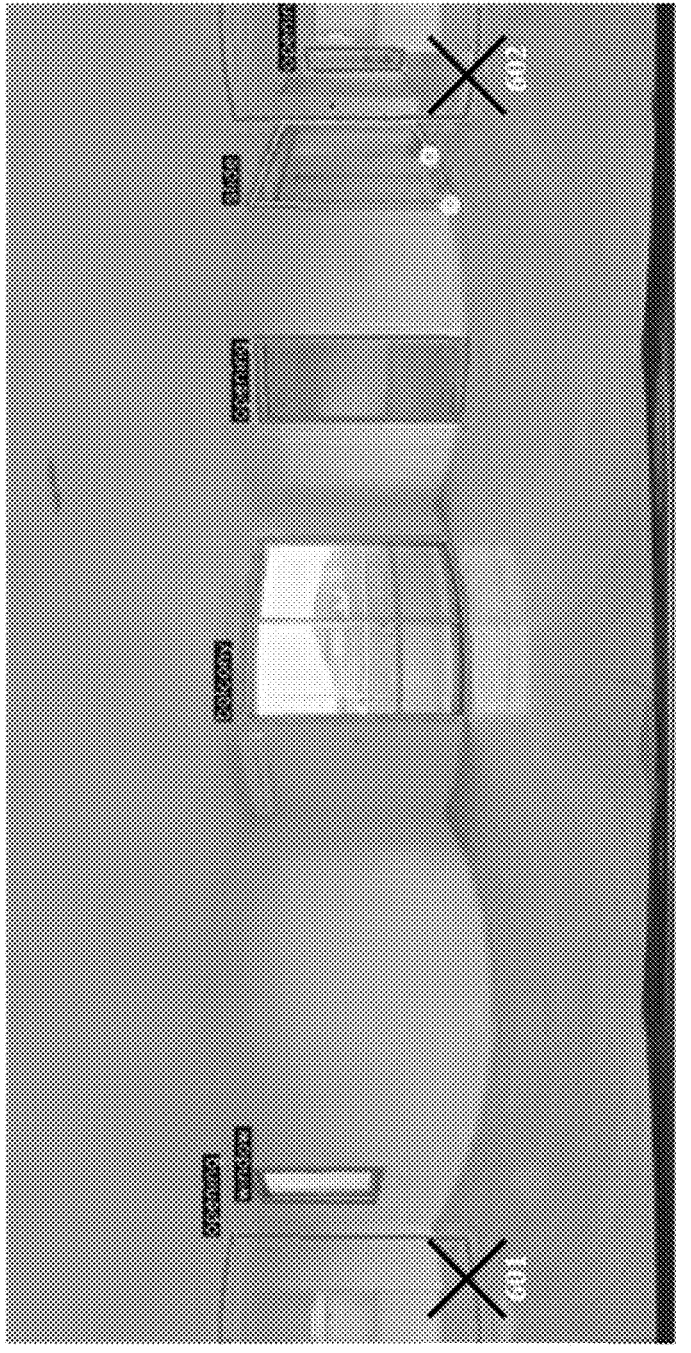

FIG.8

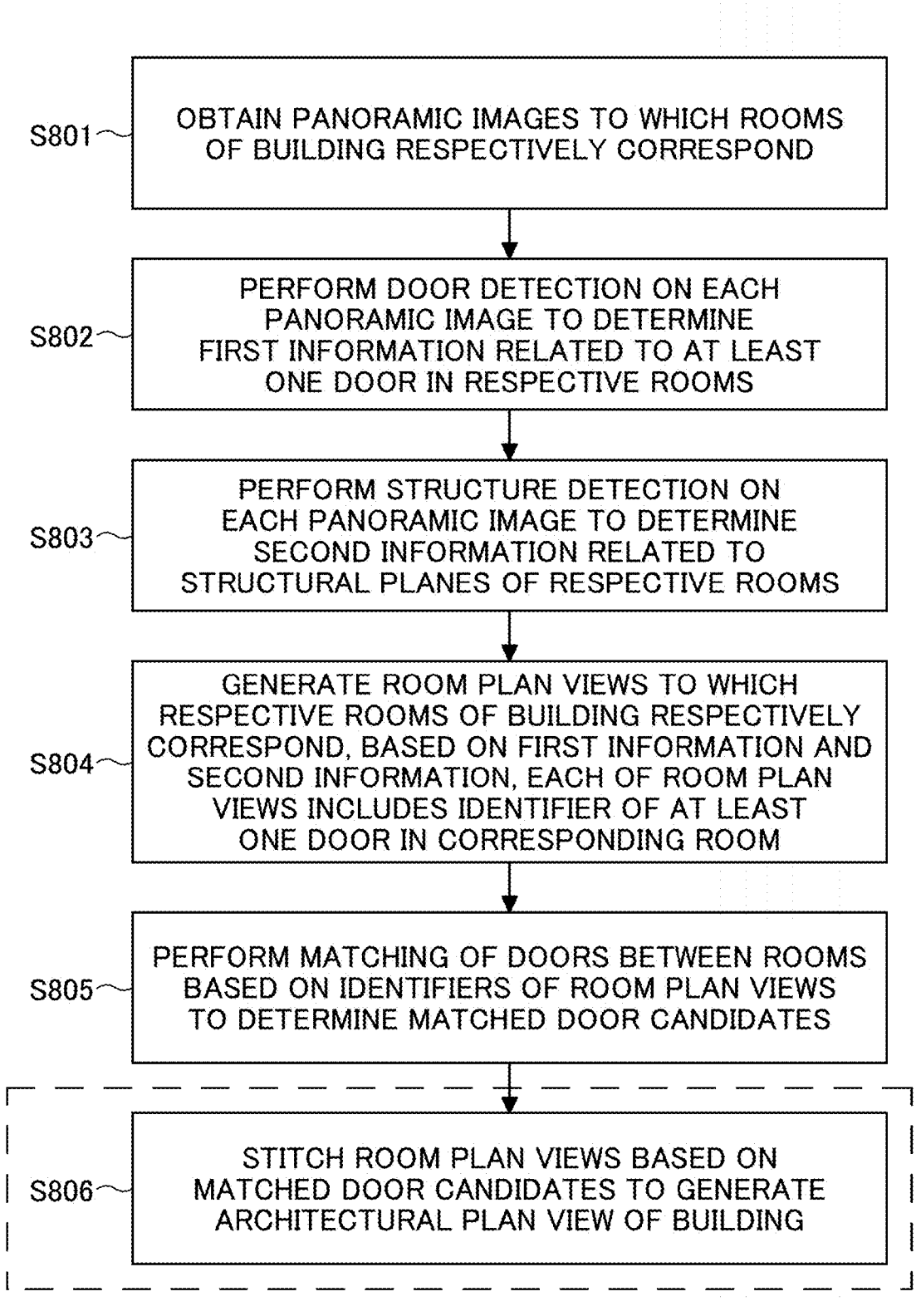

S801 — OBTAIN PANORAMIC IMAGES TO WHICH ROOMS OF BUILDING RESPECTIVELY CORRESPOND

S802 — PERFORM DOOR DETECTION ON EACH PANORAMIC IMAGE TO DETERMINE FIRST INFORMATION RELATED TO AT LEAST ONE DOOR IN RESPECTIVE ROOMS

S803 — PERFORM STRUCTURE DETECTION ON EACH PANORAMIC IMAGE TO DETERMINE SECOND INFORMATION RELATED TO STRUCTURAL PLANES OF RESPECTIVE ROOMS

S804 — GENERATE ROOM PLAN VIEWS TO WHICH RESPECTIVE ROOMS OF BUILDING RESPECTIVELY CORRESPOND, BASED ON FIRST INFORMATION AND SECOND INFORMATION, EACH OF ROOM PLAN VIEWS INCLUDES IDENTIFIER OF AT LEAST ONE DOOR IN CORRESPONDING ROOM

S805 — PERFORM MATCHING OF DOORS BETWEEN ROOMS BASED ON IDENTIFIERS OF ROOM PLAN VIEWS TO DETERMINE MATCHED DOOR CANDIDATES

S806 — STITCH ROOM PLAN VIEWS BASED ON MATCHED DOOR CANDIDATES TO GENERATE ARCHITECTURAL PLAN VIEW OF BUILDING

IMAGE PROCESSING METHOD, IMAGE PROCESSING APPARATUS, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202310257616.6 filed on Mar. 9, 2023, the entire contents of which are incorporated herein by reference.

BACKGROUND OF THE INVENTION

1. Field of the Invention

The present disclosure relates to the field of image processing, and specifically, an image processing method, an image processing apparatus, and a non-transitory computer-readable recording medium. More specifically, the image processing method of the present disclosure relates to a method of displaying an identifier regarding a door in a panoramic image and determining matched door candidates among a plurality of rooms, and a method of creating samples for training a deep learning-based neural network.

2. Description of the Related Art

Virtual roaming is an important branch of virtual reality (Virtual Reality, VR) technology, involving various industries such as construction, tourism, games, aerospace, and medicine. Through the combination of virtual scene creation technology and virtual roaming technology, a user can autonomously roam in a three-dimensional scene such as a building, a city, or a game scene, thereby intuitively feeling the scene. In recent years, with the substantial growth of online real estate and digital home decoration and design businesses, virtual roaming technology has been widely used in related fields. The virtual roaming technology may be used to realize a virtual tour of a house or a room, and may also be used to generate a corresponding plan view (or floor plan) so that customers can conveniently browse a building or a specific indoor space online.

However, the information provided to customers using the existing virtual roaming technology is still limited and may be inaccurate in some cases, resulting in customers often needing to conduct on-site inspections and also adversely affecting the generation of plan views.

Thus, there is a need for an improved method and apparatus for panoramic images.

SUMMARY OF THE INVENTION

According to an aspect of the present disclosure, an image processing method is provided. The image processing method includes obtaining a panoramic image to which a room corresponds; performing door detection on the panoramic image to determine first information related to at least one door in the room; and displaying, based on the first information, a panoramic identifier of the at least one door in the panoramic image, the panoramic identifier indicating at least a door outline, a door type and an opening type of the door.

According to another aspect of the present disclosure, an image processing method is provided. The image processing method includes obtaining a plurality of panoramic images to which a plurality of rooms of a building respectively correspond; performing door detection on each of the plurality of panoramic images to determine first information related to at least one door in the respective rooms; performing structure detection on each of the plurality of panoramic images to determine second information related to a plurality of structural planes of the respective rooms; generating, based on the first information and the second information, a plurality of room plan views to which the respective rooms of the building respectively correspond, each of the plurality of room plan views including an identifier of the at least one door in the room, and the identifier indicating at least one of a door representation, a door type, an opening type of the door, and room types of rooms on both sides of the door; and performing, based on the identifiers of the plurality of room plan views, matching of the doors between the plurality of rooms to determine matched door candidates.

According to another aspect of the present disclosure, an image processing apparatus is provided. The image processing apparatus includes a memory storing computer-executable instructions; and one or more processors. The one or more processors are configured to execute the computer-executable instructions such that the one or more processors are configured to obtain a panoramic image to which a room corresponds; perform door detection on the panoramic image to determine first information related to at least one door in the room; and display, based on the first information, a panoramic identifier of the at least one door in the panoramic image, the panoramic identifier indicating at least a door outline, a door type and an opening type of the door.

BRIEF DESCRIPTION OF THE DRAWINGS

The above and other objects, features and advantages of the present disclosure will be further clarified the following detailed description of embodiments of the present disclosure in combination with the drawings. Note that these drawings are used to provide further understanding of the embodiments of the present disclosure and form a part of the specification. The drawings are used to explain the present disclosure together with the embodiments of the present disclosure, and do not constitute a limitation of the present disclosure. Furthermore, in the drawings, the same reference numerals generally represent the same components or steps.

FIG. 1 is a flowchart illustrating an example of an image processing method according to an embodiment of the present disclosure.

FIG. 4 is a flowchart illustrating another example of the image processing method according to the embodiment of the present disclosure.

FIG. 6 is a schematic diagram illustrating falsely detected doors in a panoramic image according to the embodiment of the present disclosure.

FIG. 8 is a flowchart illustrating an example of an image processing method according to another embodiment of the present disclosure.

DESCRIPTION OF THE EMBODIMENTS

Figure 2:
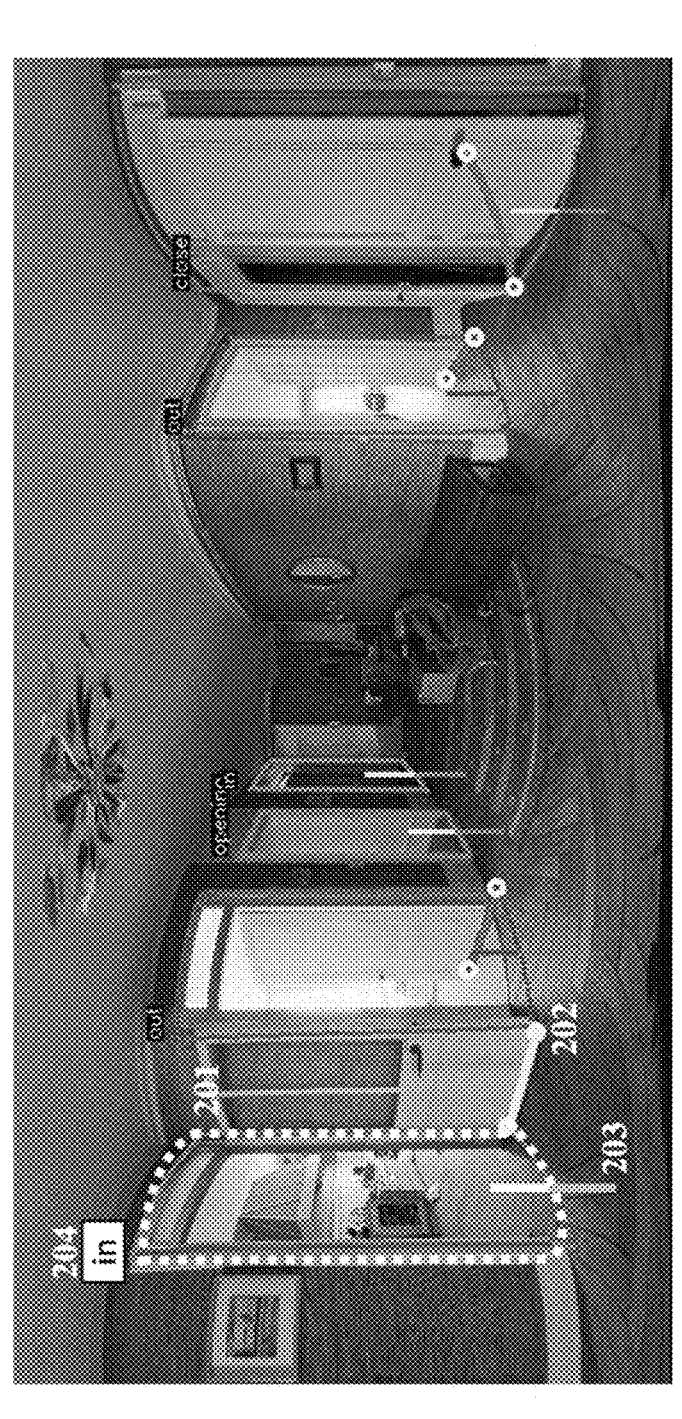
FIG. 2 is a schematic diagram illustrating a panoramic image to which a room corresponds according to the embodiment of the present disclosure.

The image processing method, the image processing apparatus, and the non-transitory computer-readable recording medium according to the embodiments of the present disclosure will be described below with reference to the accompanying drawings.

All other embodiments obtained by persons skilled in the art without exerting creative efforts based on the embodiments described in the present disclosure should fall within the protection scope of the disclosure. The embodiments described herein are merely a part of exemplary embodiments of the disclosure, rather than all embodiments of the disclosure. The embodiments described herein are illustrative only and are not intended to limit the scope of the present disclosure. In addition, in order to make the specification clearer and concise, detailed descriptions of functions and constructions well known in the art will be omitted, and repeated explanations of steps and elements will also be omitted.

In view of the problem of the conventional technologies, an object of the embodiments of the present disclosure is to provide an image processing method, an image processing apparatus, and a non-transitory computer-readable recording medium that solve at least the above technical problems of the conventional technologies or make improvements to the conventional technologies.

FIG. 1 is a flowchart illustrating an example of the image processing method according to an embodiment of the present disclosure. As shown in FIG. 1, the image processing method may include the following steps.

In step S101, a panoramic image to which a room corresponds is obtained.

According to the embodiment of the present disclosure, in this step, the panoramic image may be obtained in the following methods but not limited to the following methods. The panoramic image may be obtained from an external source such as a server or from an internal source such as a local memory via a wired or wireless manner. The panoramic image may also be obtained by photographing using an image capture device such as a camera. Furthermore, the "panoramic image" described in the present disclosure may refer to an image captured by a device such as a panoramic camera or a wide-angle camera or an image synthesized to have a larger viewpoint angle range (such as a viewpoint angle range equal to or more than 120 degrees), which is distinguished from an ordinary image captured by a standard lens or a perspective image captured by a perspective mapping manner. In addition, the panoramic image obtained in this step may be an original image. For example, the original image may be a grayscale or color image. The panoramic image may also be a processed image obtained after performing various image preprocessing on the original image. For example, the image preprocessing may include but is not limited to cropping, scaling, correction, deformation or the like.

Furthermore, in the embodiments of the present disclosure, the panoramic image to which the room corresponds may refer to a panoramic image representing a scene of the room, for example, a panoramic image obtained by photographing the room inside the room (for example, at the center of the room). The panoramic image may represent a scene with a 360-degree viewpoint angle of the room.

In the present disclosure, for the convenience of explanation, taking a residential house and its rooms as an example, the embodiments will be explained as follows. Note that the term "room" used in the present disclosure has a broader meaning and is not limited to referring to a space inside the house. Depending on the specific application, the term "room" may also include interior spaces or partitioned areas of any building and location (for example, office buildings or shopping malls).

After obtaining the panoramic image to which the room corresponds, in step S102, door detection is performed on the panoramic image to determine first information related to at least one door in the room.

According to an embodiment of the present disclosure, the door detection is performed on the obtained panoramic image in this step. Specifically, a plurality of room doors may be included in the panoramic image to which the room corresponds. For example, FIG. 2 is a schematic diagram illustrating the panoramic image to which the room corresponds according to the embodiment of the present disclosure. As shown in FIG. 2, six doors are shown in the current room, where each door has a position, a size (for example, a width, a height and a thickness, etc.), a door type (for example, a hinged door, a sliding door, a folding door, a doorframe without a door, etc.), an opening type (for example, left-side or right-side inward or outward opening, leftward or rightward sliding, upward, downward, leftward or rightward folding, etc., or more simply, left-side or right-side opening, or inward or outward opening, etc.). Furthermore, each door is connected to a specific type of room on each side (for example, a room inside the door is a living room, and a room outside the door is a kitchen). In the embodiment of the present disclosure, by performing the image processing method based on the door detection on the panoramic image, the above information about each door in the panoramic image or at least an information set including the above information can be determined. The above description is only illustrative and not restrictive. In another embodiment of the present disclosure, the door type may also include an open state of the door (for example, a closed state, a slightly open state, a half-open state, a nearly fully open state, or an open state, etc.), or refers to other aspects or type such as a material (for example, solid wood or glass, etc.) or a use (for example, fireproof or thermal insulation, etc.) of the door. In the present disclosure, the above various information related to the door in the room is called first information.

For example, according to an embodiment of the present disclosure, the performed door detection may include detecting corner point coordinates of each door (such as coordinates located at each vertex of a doorframe), thereby determining the position and size of the door. Furthermore, considering that the door may be in different states during an opening or closing process, the same characteristics of the door may show certain differences between different door states, and the differences are usually closely related to the door type and are unique to the door type. Thus, the door detection may also include recognizing characteristic elements of each door, for example, characteristic elements related to a shape, a position, a size or the like of a door leaf or a specific part, so as to determine the type, the opening type and the open state of the door. Furthermore, types of rooms connected to each side of the door may be determined by extracting and recognizing scene images inside and outside the door. In addition, according to embodiments of the present disclosure, a classification model based on a neural network may also be used to recognize and classify door images, thereby determining information such as the open state, the opening direction or the like of the door. In practical applications, any known or future door detection method may be used to determine the first information according to specific scenarios, and the present disclosure is not limited here.

In addition, for convenience of explanation, a "room door" is used as an example of a door in the embodiments of the present disclosure for description. However, the term "door" used in the present disclosure has a broader meaning and is not limited to referring to a door of a room. Depending on the application, the term "door" may also include a window, a cabinet door, a doorframe without a door or the like in a room, as well as any room element that conforms to a predetermined size and shape.

After determining the first information related to the door in the room, in step S103, a panoramic identifier of the door in the panoramic image is displayed based on the first information. The panoramic identifier indicates at least a door outline, a door type and an opening type of the door.

According to the embodiment of the present disclosure, in this step, the panoramic identifier is displayed in the panoramic image according to the first information related to the door. The displayed panoramic identifier may at least indicate the door outline, the door type and the opening type of the door. For example, as mentioned above, the position and size of the door may be determined by performing the door detection on the panoramic image, for example, by detecting the corner points of a door frame and/or a door panel, thereby defining an outline of a corresponding area of the door, such as a door frame outline, a door panel outline, a combination thereof, or at least a part thereof (namely, the door outline), in the panoramic image.

In addition, considering that image distortion occurs in panoramic images due to wide-angle lenses, and the degree of distortion is usually more severe in edge areas of the image (for example, a north pole area or a south pole area in the panoramic images, such as an area near a ceiling or a floor), according to the embodiment of the present disclosure, the image distortion in the panoramic image may be further considered in the displaying of the door outline, instead of simply defining the area where the door is located through the corner point coordinates. In other words, by introducing a distortion factor of the panoramic image, a line of the door outline in a direction where the distortion exists can be curved accordingly according to the degree of distortion of the panoramic image. For example, as shown in FIG. 2, the door outline displayed in the panoramic image can be shown in a curved polygon, so that an outline line for indicating the door (namely, edges of the curved polygon) fits the deformed door in the panoramic image better. In this way, a user can obtain the shape and area of the door from the panoramic image more accurately without causing overlapping display of the information.

Furthermore, according to embodiment of the present disclosure, in order to integrate more information into the panoramic identifier, different color outlines may be used to represent the respective door types. Alternatively, a line segment that starts from a corner point on the door axis toward an opening direction of the door (an inward or outward direction) and extends along a bottom edge of the door or a direction perpendicular to the bottom edge of the door frame may indicate the opening type. Alternatively, different symbols may be used to indicate room types of rooms on both sides of the door serving as a boundary line. Additionally or alternatively, as an example of the panoramic identifier, the above-mentioned information may also be displayed as a symbol or a text in the vicinity of the door (for example, in the area where the door is located or along the door frame). The above description is only illustrative and not restrictive. In another embodiment of the present disclosure, only a part of the above information may be displayed or more information about the door may be displayed. Alternatively, the opening type or the door may be represented by a color, and the door type may be represented by a text, or the display may be performed by a combination of the above methods.

For example, as shown in FIG. 2, taking a leftmost door in the panoramic image as an example, the panoramic identifier includes a door outline 201 shown in a specific line segment type, and for example, a dotted line may be used to indicate that the door is a hinged door. Alternatively, different colors may be used to represent the respective door types. Alternatively, a line segment 202 extending inward may be used to represent the opening direction of the door. Alternatively, a vertical line segment using different grayscales or colors on both sides of the door (for example, a line segment 203 in FIG. 2) may be used to represent room type of rooms on both sides of the door serving as a boundary line. For example, in this example, a dark line segment inside the door indicates that a room type of a room inside the door is a living room, and the light line segment outside the door indicates that a room type of a room outside the door is a kitchen. Alternatively, different line segment types may also be used to represent the respective room types. In addition, in the example of FIG. 2, a text displayed near the door outline (for example, a text box 204 in FIG. 2) may be used to indicate the status of the door or other information, so that the opening direction represented by the line segment 202 is further combined with the text to represent the specific opening type of the door to a user.

In this way, the panoramic identifier displayed in the panoramic image can display various information related to the door in an integrated manner, thereby providing a user with more sufficient and more intuitive information.

Figure 3A:
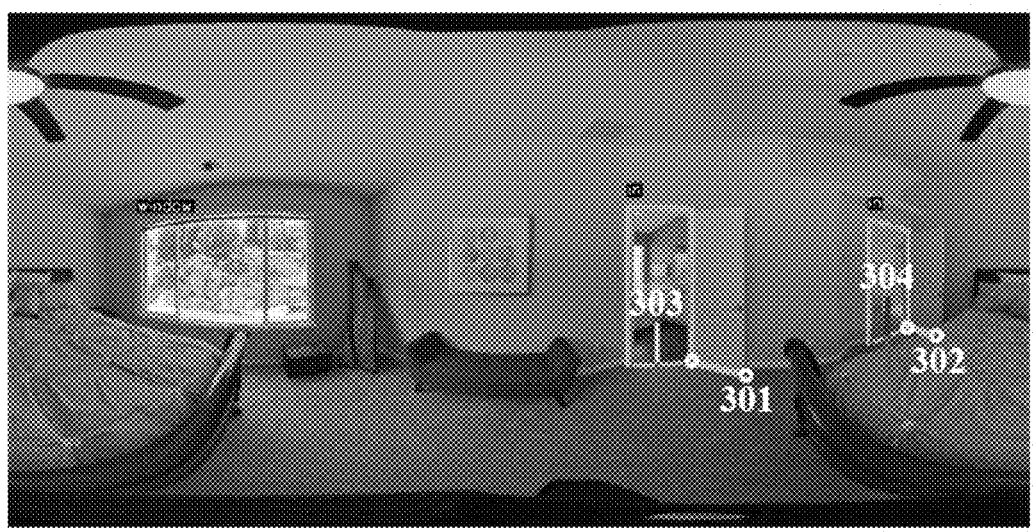
FIG. 3A and FIG. 3B are schematic diagrams illustrating displaying panoramic identifiers in a panoramic image according to the embodiment of the present disclosure.
Figure 3B:
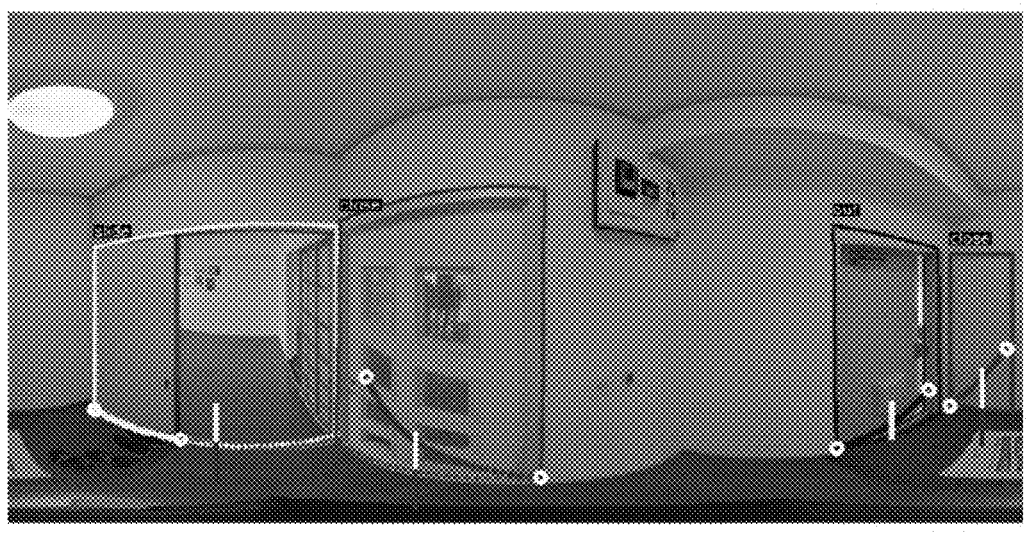

FIG. 3A and FIG. 3B are schematic diagrams illustrating displaying panoramic identifiers in a panoramic image according to the embodiment of the present disclosure, in which several examples of the panoramic identifier are given. As shown in FIG. 3A, in the panoramic image, door outlines serving as the panoramic identifiers indicate the positions of a window on the left and two doors on the right in the room, respectively. Specifically, curved polygons serving as the door outlines indicate the shapes of the window and the doors, and the colors of the door outlines indicate that the door types of the window and the doors are a window and hinged doors, respectively. In addition, line segments 301 and 302 serving as the panoramic identifiers indicate that the opening direction of the door is right-side inward opening. Alternatively, line segments 303 and 304 serving as the panoramic identifiers indicate room types of rooms on both sides of the door. Since the two doors belong to the same room, the rooms in the two doors have the same type. In addition, according to embodiment of the present disclosure, in a case where the door type indicated by the panoramic identifier is a window or a cabinet door that is not connected to a room on the outside, the explicit display of room types of rooms on both sides (or room type of room at least one side) of the door may be omitted.

Furthermore, in some scenarios, since the door may be in a fully closed or slightly open state, it may not be possible to determine the opening type of the door by recognizing characteristic elements of the door (such as hinges or slide rails). In this case, as above mentioned, other aspects of types may be displayed in the door type. For example, as shown in FIG. 3B, the panoramic identifiers indicate from left to right that the door types of the door are a sliding door, a door in a closed state, a door in a slightly open state, and a door in a closed state. In addition, in this example, an estimated position when the door is fully closed may also be shown by a dotted line, so that a user can predict the position of the door when the door is closed.

The above embodiment describes the process of displaying the panoramic identifier of the door in the panoramic image with reference to FIGS. 1 to 3. Through the above embodiment, more sufficient and more accurate information can be intuitively provided to a user in the panoramic image.

In addition, in order to provide more sufficient information about the room to a user so as to facilitate the user to switch and compare between the panoramic view and the plan view (for example, a top view or a floor plan), according to a preferable embodiment of the present disclosure, the image processing method may further include displaying a plan identifier of the door in a two-dimensional plan view. The basic flow of the processing will be described in detail with reference to FIG. 4. As shown in FIG. 4, the image processing method may include the following steps.

In step S401, structure detection is performed on the panoramic image to determine second information related to a plurality of structural planes of the room.

According to the embodiment of the present disclosure, in this step, the structure detection is further performed on the panoramic image obtained in step S101. Specifically, the three-dimensional space of the room may usually be formed by a plurality of structural planes of the room (for example, including walls, a floor, and a ceiling). The spatial characteristics of the room may include the spatial position coordinates of the walls, the floor, and the ceiling that form the room, the vertical or parallel geometric relationships between the walls, the wall and the floor, the wall and the ceiling, and the edge positions of the boundaries thereof, etc. In order to generate a two-dimensional plan view of the room, the above information may be determined by performing the structure detection. In the present disclosure, the above various information related to the structural plane of the room is called the second information. In practical applications, any known or future structure detection method may be used to determine the second information according to specific scenarios, and the disclosure is not limited here.

In addition, for convenience of explanation, in the embodiment of the present disclosure, "walls", "floors", and "ceilings" are used as examples of the structural planes for description. However, the term "structural planes" used in the present disclosure have a broader meaning, which may also refer to any other planes or walls in the room that have a divisible property.

After the first information related to the door in the room is determined, in step S402, the two-dimensional plan view of the room is generated based on the second information.

Figure 5A:
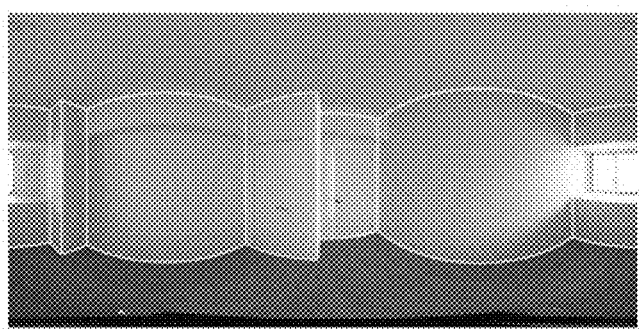
FIG. 5A to FIG. 5D are schematic diagrams illustrating displaying plan identifiers in a two-dimensional plan view according to the embodiment of the present disclosure.
Figure 5B:
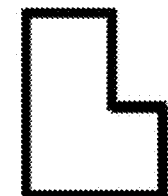

According to the embodiment of the present disclosure, the step of generating the two-dimensional plan view of the room may include the following steps. A three-dimensional representation of the room in a three-dimensional spatial coordinate system is generated based on the second information. Then, the three-dimensional representation is converted into a two-dimensional planar coordinate system to generate the two-dimensional plan view of the room. Specifically, FIG. 5A to FIG. 5D are schematic diagrams illustrating displaying plan identifiers in a two-dimensional plan view according to the embodiment of the present disclosure. After determining the second information related to the structural plane of the room, three-dimensional reconstruction may be performed using a deep neural network model such as HorizonNet to construct the three-dimensional representation of the room and obtain boundary lines at the edges of the structural planes in the room, as shown in FIG. 5A. Then, the obtained three-dimensional representation of the room is projected onto the two-dimensional planar coordinate system parallel to the floor, thereby obtaining the plan view of the room, as shown in FIG. 5B. The two-dimensional plan view shows a geometrical shape a size of the room corresponding to the panoramic image in top view.

After generating the two-dimensional plan view of the room, in step S403, a plan identifier of each door in the room is displayed in the generated two-dimensional plan view, based on the first information determined by the door detection and the second information determined by the structure detection. The plan identifier indicates at least a two-dimensional door representation, the door type and the opening type of the door.

Figure 5C:
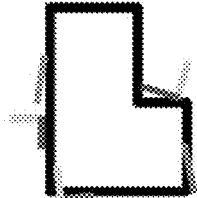

Specifically, the two-dimensional door representation of each door may be determined at the corresponding position in the two-dimensional plan view of the room, according to the first information related to the doors in the room that has been determined in step S102. For example, by using a method similar to the method in the above step, the three-dimensional representation of the door detected in the panoramic image may be converted into the same two-dimensional plane coordinate system as the plan view of the room. Then, the two-dimensional door representation of the door may be added to the generated two-dimensional plan view, thereby indicating the position and the size of the door in the two-dimensional plan. Then, the information such as the door type, the opening type, and the room types of the rooms on both sides of the door may be further recognized, based on the previously determined first information. As mentioned above, the plan identifiers of the respective doors may be displayed in a display manner similar or corresponding to panoramic identifiers. As shown in FIG. 5C, the plan identifier of each door is further shown in the two-dimensional plan view, which can indicate the two-dimensional door representation, the door type and the opening type of each door, and optionally, the room types of the rooms on both sides of the door. In this way, the plan view of the room can be generated for the user, and the information determined in the door detection can be reused to display various information about the door in the generated two-dimensional plan view, thereby facilitating the user to switch and compare between the panoramic view and the plan view to display information about the room more completely.

Furthermore, as shown in FIG. 5C, in some cases, the two-dimensional door representation displayed in the two-dimensional plan view may incompletely fit the edge of the room due to factors such as errors in corner point coordinates or errors in coordinate transformation, which results in inaccurate information such as the position and the opening type of the door.

Figure 5D:
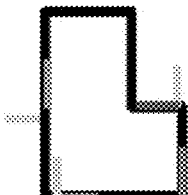

In order to optimize the two-dimensional door representation of the door, according to a preferable embodiment of the present disclosure, the step of displaying the plan identifier of the door in the two-dimensional plan view of the room may include the following steps. The two-dimensional door representation of the door is vertically projected onto an edge in the two-dimensional plan view of the room to which a corresponding structural plane corresponds, based on the first information and the second information, so as to generate a substitute two-dimensional representation of the door. Specifically, the coordinate values of the corner points of the door and the shape of the room (namely, the representations of the walls) in the two-dimensional coordinate system may be determined based on the first information and the second information. Then, the two-dimensional door representation may be projected onto the edge to which the corresponding wall corresponds by a plane coordinate operation. Thus, the substitute two-dimensional representation generated by the projection can coincide with the representation of the wall of the room, as shown in FIG. 5D. Then, the generated substitute two-dimensional representation is displayed as the two-dimensional door representation of the door in the room in the two-dimensional plan view. Thus, the position and the opening direction of the door can be corrected. In this embodiment, the "corresponding structural plane" in the two-dimensional plan view refers to the wall where the door is actually located. For example, the corresponding structural plane of each door may be determined by setting a rule for calculating an angle and/or a distance between the door (the door frame) and the wall.

In addition, according to a preferable embodiment of the present disclosure, in order to ensure that the size of the door is not affected by the projection process, the width of the door may further be determined based on the first information, and the generated substitute two-dimensional representation may be adjusted according to the determined width of the door after the projection process. For example, the actual width of the door may be determined, by calculating a distance between corner points of the door in a horizontal direction based on the distortion of the panoramic image or the depth information of the image, or by calculating a distance between the corner points of the door and a camera based on a trigonometric function relationship. In this way, it is possible to optimize the two-dimensional door representation of the door while avoiding the adverse effects of the projection process on the size of the door in the two-dimensional plan view.

Additionally, in some cases, false detections of doors may occur. FIG. 6 is a schematic diagram illustrating falsely detected doors in a panoramic image according to the embodiment of the present disclosure. As shown in FIG. 6, wrong panoramic identifiers 601 and 602 are displayed in the left and right edge areas of the panoramic image. In fact, the door described in the present disclosure does not exist in the areas, so falsely detected doors are generated.

In order to remove falsely detected doors in the panoramic image and avoid generating and displaying wrong panoramic identifiers, according to a preferable embodiment of the present disclosure, before displaying the panoramic identifier or the plan identifier for each door, the image processing method according to the present disclosure may further include the following steps. A distance between a representative point of the door in the room and a corresponding structural plane is determined based on the first information and the second information. Then, a "door" whose determined distance is greater than a threshold (namely, a falsely detected door) is removed from the detected doors. Specifically, as mentioned above, coordinates of pixels corresponding to the door and coordinates of the corresponding structural plane of the door may be determined from the first information and the second information, and the distance between the representative point of the door and the corresponding structural plane may be calculated based on the coordinates. Preferably, a midpoint of the door may be selected as the representative point to calculate the distance between the door and the corresponding structural plane. Then, the calculated distance is compared with a preset threshold to determine whether it is a falsely detected door. If it is determined that the distance is greater than the threshold or does not meet a threshold range, it may be determined that the door is a falsely detected door. Thus, the falsely detected door can be removed to avoid displaying the identifier of the falsely detected door. According to another embodiment, a distance between the representative point of the door and the floor or ceiling adjacent to the door may be calculated. Specifically, in this embodiment, a midpoint of a upper/lower door frame may be selected as the representative point to calculate a distance between the door and the adjacent floor or ceiling, thereby removing a door whose distance is not within the threshold range. In addition, depending on specific applications, different thresholds or range intervals may be set to meet the optimization for different scenarios. In this way, the accuracy of image processing and information presentation can be further improved, and processing efficiency can be improved.

Additionally, according to the embodiment of the present disclosure, the door detection and the structure detection or a part thereof may be performed using a deep learning-based neural network. For example, as described above, the information of the door such as the open state and the opening direction may be determined by using a neural network-based classifier. The present disclosure provides a method for training a neural network that performs the image processing method described herein. The method may specifically include a step of generating samples for training the neural network and constructing the neural network using the following method.

Specifically, in order to perform the various methods described in the present disclosure, the method for training the deep learning-based neural network may include the following steps. a plurality of sample panoramic images with different viewpoint angles is generated by performing spatial transformation on the panoramic image (for example, the panoramic image obtained in step S101). By performing the spatial transformation on the original panoramic image, a camera motion (namely, the camera photographs at different positions and at different angles) can be simulated, so that the generated sample target panoramic images can have a different viewpoint angle from the source panoramic image. In this way, the training sample set can be expanded. For example, multi-view comparative learning may be performed using the expanded image feature training samples, which provides additional information for the deep learning-based neural network, thus a better result can be achieved in subsequent processing (or called downstream tasks) by using a machine learning model.

Specifically, according to embodiment of the present disclosure, the step of performing spatial transformation on the panoramic image may include the following steps. The pixels in the original panoramic image are transformed into another spatial coordinate system through a specific mapping method, so that the pixels in the original panoramic image are transformed in different coordinate systems to obtain an image composed of the transformed pixels. For example, through the three-dimensional surface mapping transformation, the original panoramic image may be mapped onto a surface of a three-dimensional shape to obtain a three-dimensional surface image, so that the three-dimensional surface image can be translated, rotated, or translated and rotated during subsequent processing, thereby performing rotation of specific areas in the panoramic image. The three-dimensional shape may be a sphere, a cube or any other three-dimensional shape described in a three-dimensional space. Accordingly, the three-dimensional surface mapping transformation may include a spherical mapping transformation, a cube mapping transformation, or any other mapping transformation for mapping the two-dimensional panoramic image onto the surface of the three-dimensional shape.

Furthermore, according to the embodiment of the present disclosure, the transformation performed on the panoramic image may be adjusted by setting different spatial transformation parameters. For example, for an image with a large degree of distortion, the amount of translation/rotation transformation of the three-dimensional spherical surface may be appropriately increased, so that an area with a large degree of distortion in the source panoramic image (for example, a north pole area or a south pole area in the panoramic image, such as an area near the ceiling or the floor) is transformed into an area with a small degree of distortion (for example, an area near the equator in the panoramic image), and vice versa. In this way, compared with the source panoramic image, a panoramic image whose same area has different degrees of distortion can be obtained, which is beneficial to fusion of subsequent image processing results.

Figure 7:
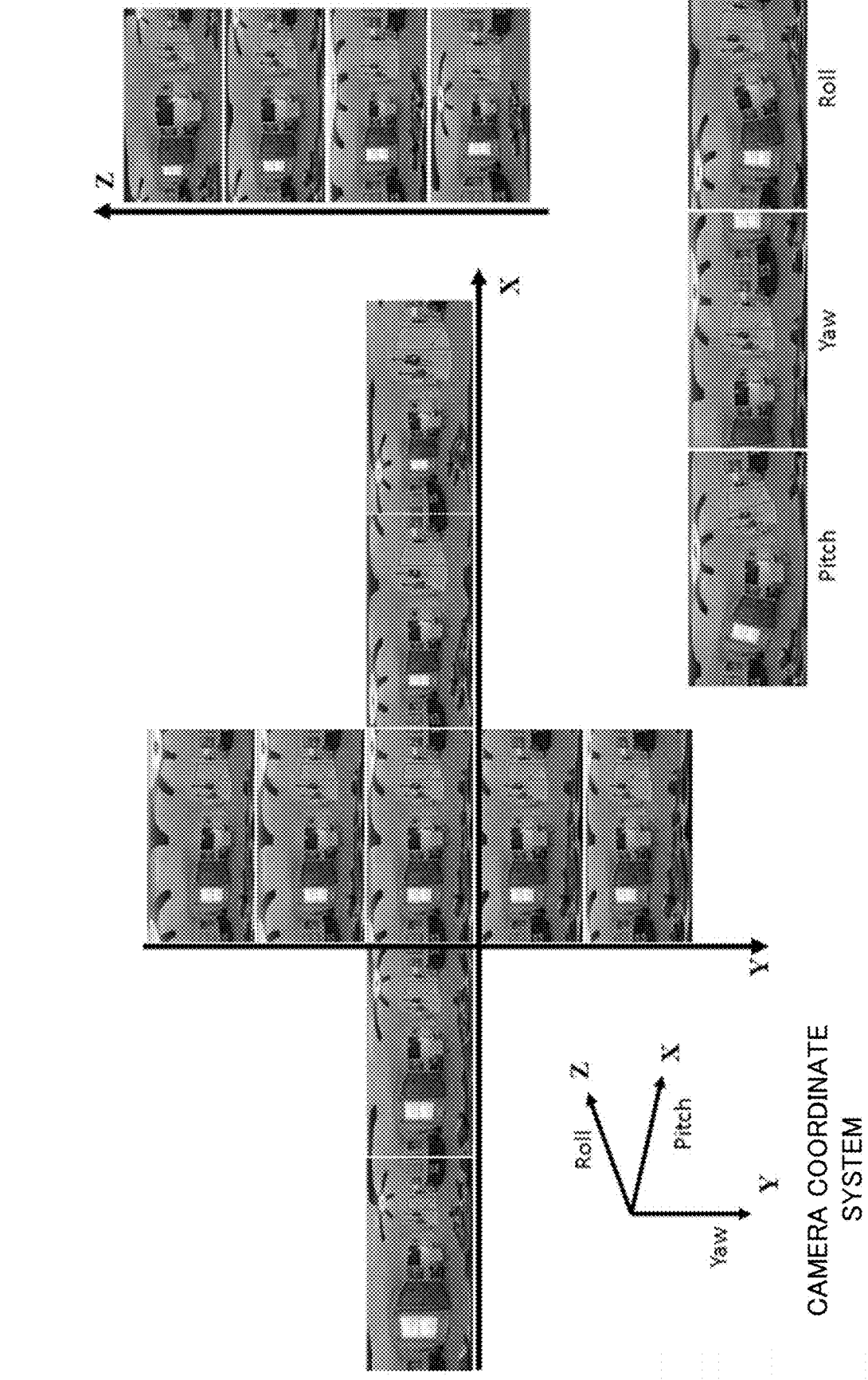
FIG. 7 is a schematic diagram illustrating the generation of a plurality of sample panoramic images according to the embodiment of the present disclosure.

FIG. 7 is a schematic diagram illustrating the generation of a plurality of sample panoramic images according to the embodiment of the present disclosure. As shown in FIG. 7, by performing different spatial transformations on the panoramic image, the corresponding panoramic images captured at different shooting angles due to camera movement can be simulated. In other words, the generated sample panoramic images can have different viewpoint angles from the source panoramic image, and the images corresponding to the same area can have different degrees of distortion, thus more sufficient image information can be provided. Thus, an improved model for performing the methods according to the present disclosure can be constructed by the deep learning-based neural network trained by using the generated sample panoramic images, thereby achieving better image processing tasks such as detection and recognition.

The embodiments of displaying the identifiers of the doors in the panoramic image are described above with reference to FIGS. 1 to 7. Through the above embodiments, the identifiers of the doors in the room containing more information can be displayed in the panoramic image, and a plan view containing corresponding identifiers can be generated using the determined various information. Thus, the accuracy of the information can be improved, and the efficiency of image processing can be improved. In addition, the training samples of the neural network for the image processing are expanded by simulating the camera motion. Thus, the improved model for the door detection and the structure detection can be obtained, and the accuracy of the determined information can be further improved.

The basic flow of another example of the image processing method according to the embodiment of the present disclosure will be described in detail below with reference to FIGS. 8 and 9. As shown in FIG. 8, the image processing method may include the following steps.

In step S801, a plurality of panoramic images to which a plurality of rooms of a building respectively correspond are obtained.

According to the embodiment of the present disclosure, a plurality of panoramic images may be obtained in this step in a similar manner as described in step S101. In the embodiment of the present disclosure, the panoramic image to which the room of the building corresponds refers to a panoramic image representing a certain room in the building. For example, panoramic images are obtained by photographing all room or a part of the rooms in the building, thereby obtaining the plurality of panoramic images to which the rooms of the building respectively correspond.

After obtaining the above panoramic images, in step S802, door detection is performed on each of the plurality of panoramic images to determine first information related to at least one door in the respective rooms. Then, in step S803, structure detection is performed on each of the plurality of panoramic images to determine second information related to a plurality of structural planes of the respective rooms.

According to the embodiment of the present disclosure, in these two steps, the door detection and the structure detection are performed for each panoramic image respectively to determine the first information related to at least one door in the corresponding room, and the second information related to the structural planes of the corresponding room. In addition, in the above steps, the first information and the second information may be determined by similar methods to the door detection and structure detection described above. In the embodiment of the present disclosure, the above steps may be performed in the order shown in FIG. 8, may be performed at the same time, or may be performed in an order of performing step S803 first and then performing step S802.

After determining the first information and the second information, in step S804, a plurality of room plan views to which the respective rooms of the building respectively correspond are generated based on the first information and the second information. Each of the plurality of room plan views includes an identifier of the at least one door in the room, and the identifier indicates at least one of a door representation, a door type, an opening type of the door, and room types of rooms on both sides of the door.

According to the embodiment of the present disclosure, in this step, the plurality of room plan views may be generated and the identifiers may be displayed in the room plan views in a similar manner as described above with reference to FIG. 4. The "room plan view" may refer to a two-dimensional plan view of a single room of the building, and the "identifier" may be displayed in a similar manner as the plan identifier described above, thereby indicating the various information described above about each door (such as the door representation, the door type, the opening type of the door, the room types of the rooms on both sides of the door and the like).

After generating the plurality of room plan views and displaying the identifiers, in step S805, matching of the doors between the plurality of rooms is performed based on the identifiers of the plurality of room plan views to determine matched door candidates.

Figure 9B:
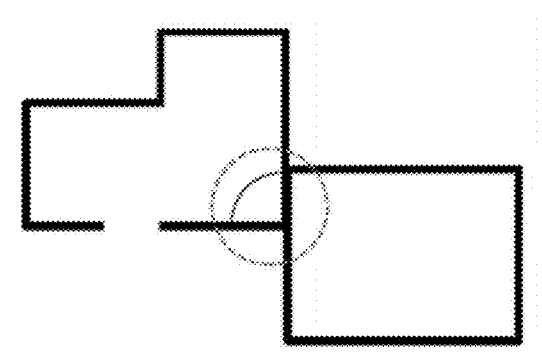
FIG. 9A and FIG. 9B are schematic diagrams illustrating stitching plan views based on matched door candidates according to the embodiment of the present disclosure.
Figure 9A:
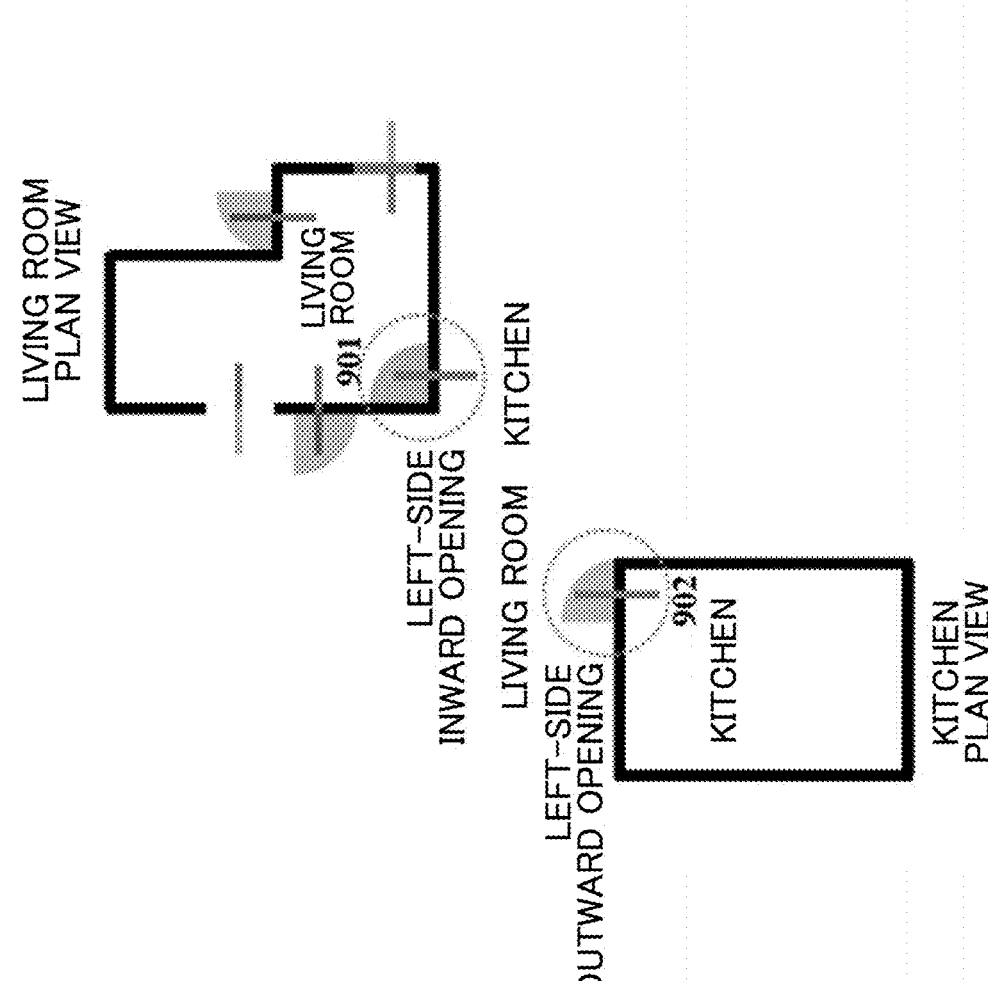

According to the embodiment of the present disclosure, in this step, the matching is performed between the doors in the plurality of rooms based on information corresponding to the identifier of each door in the room. Specifically, the doors connecting the rooms with the same room type may be determined based on the room types of the rooms on both sides of the door. For example, as shown in FIG. 9A, in the plan view of a living room, a line segment 901 indicates that two rooms on both sides of one door are a living room and a kitchen, respectively. In the plan view of a kitchen, a line segment 902 indicates that two rooms on both sides of another door are also a living room and a kitchen, respectively. Thus, it may be determined that the two doors in the two rooms are the same door, and the door may be determined as the matched door candidate, as shown by a dotted circle in FIG. 9A. In this way, the doors in a plurality of rooms which may be the same door can be preliminarily determined as the matched door candidates. Thus, useful information can be provided for a user to understand the overall structure of the building with the plurality of rooms, thereby performing potential subsequent processing, for example determining room connection relationships and generating building plan views.

In addition, according to the embodiment of the present disclosure, it may be further determined whether the doors in the different rooms match, based on the size, the position, the door type, the opening type of each door, or a combination thereof, thereby further improving the accuracy of matching. For example, in a case where two bedrooms are connected to the same living room, the rooms on both sides of the doors of the two bedrooms may have the same room type. Thus, the matched door candidates may be further determined based on the opening type and the position of the doors.

In addition, according to the embodiment of the present disclosure, preferably, the image processing method may further include the following step. In step S806, the plurality of room plan views are stitched based on the matched door candidates to generate an architectural plan view of the building.

The present disclosure considers that the matched door candidates actually serve as connection points between the rooms, namely, the plurality of rooms are connected to each other through the doors to form the overall structure of the building. Thus, after determining the matched door candidates between the rooms through the above method, the connection relationship between the rooms can be determined. According to the embodiment of the present disclosure, in this step, the plan views of rooms with the same matched door candidates are stitched, so that the architectural plan view of the entire building can be generated. For example, as shown in FIG. 9B, the determined matched door candidates are used as a connection point of the corresponding two rooms, and the plan views of the two rooms are stitched to form the plan view of the kitchen and the living room. In this way, a plan view of the entire house can be generated by stitching all of the room plan views.

Through the above steps, in the image processing method according to the embodiment of the present disclosure, for the building with the plurality of rooms, the door candidates for generating the plan views can be determined while presenting information, thereby generating the plan view of the entire building more accurately. Thus, the efficiency and accuracy of the image processing can be improved.

According to the above image processing method of the present disclosure, each door in the room can be identified in the panoramic image based on the information determined by performing the door detection, thereby providing a user with more sufficient and more accurate information. Furthermore, according to the method of the present disclosure, the door candidates for generating the plan views can be determined while presenting information, thereby generating the plan view of the entire building more accurately. Thus, the efficiency and accuracy of the image processing can be improved. In addition, the above method can also be performed based on the neural network, and the present disclosure also provides a corresponding neural network training method, which further improves the accuracy of the above image processing method.

In another embodiment of the present disclosure, an image processing apparatus is further provided. Next, an example of the image processing apparatus according to the embodiment of the present disclosure will be described with reference to FIG. 10.

Figure 10:
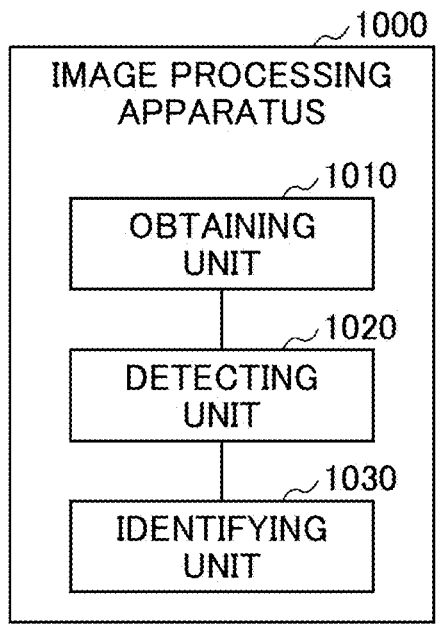
FIG. 10 is a block diagram illustrating an example of an image processing apparatus according to an embodiment of the present disclosure.

FIG. 10 is a block diagram illustrating the example of the image processing apparatus 1000 according to the embodiment of the present disclosure. As shown in FIG. 10, the image processing apparatus 1000 may include an obtaining unit 1010, a detecting unit 1020 and an identifying unit 1030. Note that the structure shown above is only illustrative and not restrictive, and in addition to these units, the image processing apparatus 1000 may further include other components. However, since these components have nothing to do with the content of the embodiments of the present disclosure, they are not used herein, and their illustrations and descriptions are omitted.

In addition, since the specific details of the following operations performed by the image processing apparatus 1000 according to the embodiment of the present disclosure are substantially similar to the details described above with reference to FIGS. 1 to 9, the description of the same details is omitted herein for the purpose of brevity. The modules or components in the image processing apparatus 1000 will be introduced one by one below.

The obtaining unit 1010 is configured to obtain source panoramic images. The specific processing performed by the obtaining unit 1010 may be consistent with the corresponding content of step S101 described above with reference to FIG. 1.

Specifically, according to the embodiment of the present disclosure, the obtaining unit 1010 may be an image capture device such as a mobile phone, a camera, a video camera, or a component in such a device for capturing images, or may be a device for receiving the captured image from the image capture device or the component. In addition, the obtaining unit 1010 may be a physically separate component from other modules in the image processing apparatus 1000, and the captured image may be transmitted by the obtaining unit 1010 to other modules in the image processing apparatus 1000 via a wired or wireless manner. Alternatively, the obtaining unit 1010 may also be integrated in the same component or within the same system as other modules in the image processing apparatus 1000, and other modules or components in the image processing apparatus 1000 receive images obtained by the obtaining unit 1010 via an internal bus.

The detecting unit 1020 is configured to perform door detection on the panoramic image to determine first information related to at least one door in the room. The specific processing performed by the detecting unit 1020 may be consistent with the corresponding content of step S102 described above with reference to FIG. 1. In addition, according to the embodiment of the present disclosure, the detecting unit 1020 may also be configured to perform structure detection on the panoramic image described above, and the door detection and the structure detection may be performed using a deep learning-based neural network.

The identifying unit 1030 is configured to display a panoramic identifier of the at least one door in the panoramic image based on the first information. The panoramic identifier indicates at least a door outline, a door type and an opening type of the door, and optionally, indicates room types of rooms on both sides of the door. In addition, according to the embodiment of the present disclosure, the identifying unit 1030 may also be configured to generate a two-dimensional plan view of the room, and display a plan identifier of the at least one door in the two-dimensional plan view. In addition, according to the embodiment of the present disclosure, the identifying unit 1030 may also be configured to the above-described steps of removing falsely detected doors and optimizing the two-dimensional door representations of the doors.

In another embodiment of the present disclosure, another image processing apparatus is further provided. Next, an example of the image processing apparatus according to the embodiment of the present disclosure will be described with reference to FIG. 11.

Figure 11:
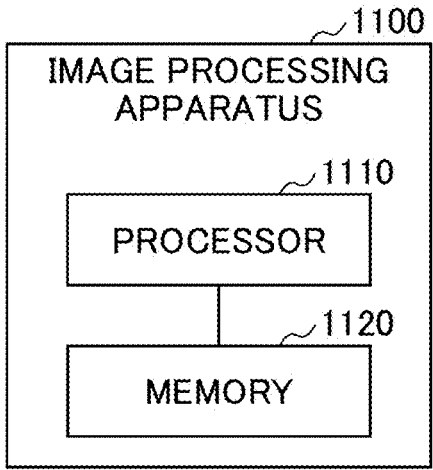
FIG. 11 is a block diagram illustrating another example of the image processing apparatus according to the embodiment of the present disclosure.

FIG. 11 is a block diagram illustrating another example of the image processing apparatus 1100 according to the embodiment of the present disclosure. As shown in FIG. 11, the image processing apparatus 1100 includes a processor 1110 and a memory 1120. The image processing apparatus 1100 may be a computer or a server. Note that the structure shown above is only exemplary and not restrictive, and in addition to these units, the image processing apparatus 1100 may also include other components. Since these components have nothing to do with the content of the embodiments of the present disclosure, the components are not included in the present disclosure, and their illustrations and descriptions are omitted.

In addition, since the specific details of the following operations performed by the image processing apparatus 1100 according to the embodiment of the present disclosure are substantially similar to the details described above with reference to FIGS. 1 to 9, the description of the same details is omitted herein for the purpose of brevity. The modules or components in the image processing apparatus 1100 will be introduced one by one below.

The processor 1110 may be a central processing unit (CPU) or another form of processing unit having data processing capabilities and/or instruction execution capabilities, and may utilize computer program instructions stored in the memory 1120 to perform desired functions. The processor 1110 may be configured to obtain a panoramic image to which a room corresponds, perform door detection on the panoramic image to determine first information related to at least one door in the room; and display a panoramic identifier of the at least one door in the panoramic image based on the first information. The panoramic identifier indicates at least a door outline, a door type and an opening type of the door.

The memory 1120 may include one or more computer program products, and the computer program products may include various forms of computer readable storage media, such as volatile memory and/or nonvolatile memory. One or more computer program instructions may be stored in the computer readable storage medium, and the processor 1110 may execute the program instructions to implement the functions of the image processing apparatus of the embodiments of the present disclosure described above and/or other desired functions, and/or may perform the image processing method of the embodiments of the present disclosure. Various application programs and various data may also be stored in the computer readable storage medium.

In another embodiment of the present disclosure, a non-transitory computer-readable recording medium is further provided. The non-transitory computer-readable recording medium has computer-executable instructions for execution by one or more processors. When the computer-executable instructions are executed, the computer-executable instructions cause the one or more processors to carry out an image processing method. The image processing method includes obtaining a panoramic image to which a room corresponds; performing door detection on the panoramic image to determine first information related to at least one door in the room; and displaying, based on the first information, a panoramic identifier of the at least one door in the panoramic image, the panoramic identifier indicating at least a door outline, a door type and an opening type of the door.

The above steps performed by the processor according to the embodiment of the present disclosure are consistent with the corresponding contents of the embodiments described above with reference to FIGS. 1 to 9. In addition, note that each component or module in the above image processing apparatus may be implemented by hardware, may also be implemented by software, and may also be implemented by a combination of hardware and software.

Noted that, the above specific embodiments are just examples and the present disclosure is not limited to these embodiments. A person skilled in the art may merge and combine the steps and apparatuses separately described in the embodiments according to the concept of the present disclosure to achieve the effect of the present disclosure. The above embodiments obtained by the merging and combination are included in the present disclosure and their descriptions are omitted here. Noted that, the advantages, benefits and effects described in the present specification are just examples, the present disclosure is not limited to these examples, and it cannot be considered that these advantages, benefits and effects are required by the embodiments of the present disclosure. Furthermore, the specific content of the present specification is only for description and understanding rather than limitation, and the present disclosure is not limited to specific content.

The block diagrams of the units, apparatuses, devices and system are just examples, the connection, placement and configuration illustrated in the block diagrams related to the present disclosure are not limited to these examples, and the units, apparatuses, devices and system may be connected, placed or configured in any way. The terms "comprise", "include" and "have" are open-form terms, which mean and may be changed into "include and is not limited to". The terms "or" and "and" mean and may be changed into "and/or", unless the context is clearly not applicable. The term "such as" means and may be changed to "such as, but not limited to".

The flowchart and the method according to the present disclosure are just examples, and not limited to the steps in the embodiments. The steps of the embodiments may be performed in any order. The terms "next", "subsequently" and "then" are just for describing the present disclosure, and the present disclosure is not limited to these terms. Furthermore, the articles "a", "an" and "the" should not be limited to the singular element.

In addition, the steps or apparatuses of the present disclosure are described above. The above descriptions of the embodiments are just examples, and various modifications, replacements or combinations may be made without departing from the scope of the present disclosure by persons skilled in the art. Furthermore, the methods and functionality disclosed herein include one or more operations for implementing the described methods. Methods and/or operations may be interchanged with each other without departing from the scope of the claims. In other words, unless a specific order of actions is specified, the order and/or use of specific operations may be modified without departing from the scope of the claims.

The steps of the above method may be performed by any appropriate means that can perform the corresponding functions. The means may include any components and/or modules of hardware and/or software, and include but are not limited to a circuit, a dedicated application-specific integrated circuit (ASIC) or a processor. The present disclosure may use a general-purpose processor, a digital signal processor (DSP), an ASIC, a field programmable gate array (FPGA) or other programmable logic device (PLD), a discrete gate or transistor logic, discrete hardware components or any other combination for executing the functions to realize the logic blocks, modules and circuits of the embodiments. The general-purpose processor is a micro-processor, and alternatively, the processor may be any processor, controller, micro-controller or state machine that can be obtained commercially. The processor may also be the combination of computer equipment, such as the combination of a DSP and a micro-processor, the combination of plural micro-processors, or the combination of a DSP and plural micro-processors.

The steps of the method according to the present disclosure may be incorporated in the hardware, software modules executed by a processor or the combination of these two directly. The software modules may be stored in a recording medium with any configuration. The examples of the recording medium includes a random access memory (RAM), a read-only memory (ROM), a flash memory, an EPROM memory, an EEPROM memory, a register, a hard disk drive, a removable disk, a CD-ROM, etc. The recording medium may be linked to a processor so that the processor reads information from the recording medium or writes information into the recording medium. Alternatively, the recording medium and the processor may also be a whole apparatus. The software module may be a single command or many commands, and may be distributed in several code segments, different programs or plural recording media.

Thus, the operations may be performed by a computer program product. For example, such a computer program product may be a tangible medium where computer-readable commands are stored (or coded), and the commands may be executed by one or more processors to perform the operation. The computer program product may include packaging material. The software or commands may also be transmitted by a transmission medium. For example, a coaxial cable, an optical cable, a twisted cable, a digital subscriber line (DSL), or a transmission medium of the wireless technology of infrared, wireless or microwave may be used to transmit the software from a website, a server or another remote source.

Additionally, the modules and/or other appropriate means of the method or technology may be obtained from a user terminal and/or base station, or by other methods. For example, such equipment may be connected to a server so as to perform the transmission of the means of the above method. Alternatively, the methods may be provided via a storage unit (for example, a physical storage medium such as a RAM, a ROM, a CD or a floppy disk), so that the user terminal and/or the base station can obtain the methods when it is connected to the equipment. Furthermore, any other appropriate technology may be provided to the equipment by the method.

The present disclosure and the appended claims include other examples and implementations. For example, the above functions may be implemented by a processor, hardware, software, firmware, hard-wire or any combination thereof. The features for implementing the functions may be located at any physical location, including being distributed such that a part of the functions may be realized at a different physical location(s). Furthermore, the term "or" before the term "at least one" means a separate enumerating, and for example, "at least one of A, B or C" means (1) A, B or C, (2) AB, AC or BC, or (3) ABC (namely, A and B and C). Additionally, the term "example" does not mean a preferable example or an example superior to other examples.

Various modifications, replacements or combinations may be made without departing from the scope of the present disclosure by persons skilled in the art. Furthermore, the scope of the present specification and the claims are not limited to the above processing, machine, manufacture, composition of events, means, method and operation. The processing, machine, manufacture, composition of events, means, method and operation with a similar function or a similar result may also be applied to the present disclosure. Therefore, the scope of the appended claims include such processing, machine, manufacture, composition of events, means, method and operation.

The embodiments have been described above so that persons skilled in the art can implement the present disclosure. Various modifications to these embodiments will be apparent to persons skilled in the art, and the general principles defined herein may be applied to other aspects without departing from the scope of the present disclosure. Thus, the present disclosure is not intended to be limited to the above described embodiments, but rather is the broadest scope consistent with the principles and novel features of the present disclosure.

The foregoing has been described for purposes of illustration and understanding. The above description is not intended to limit the embodiments of the present disclosure. While several embodiments and examples have been described above, variations, modifications, changes, additions, and combinations can be performed by persons skilled in the art.

What is claimed is:

1. An image processing method, comprising:
obtaining a panoramic image to which a room corresponds;
performing door detection on the panoramic image to determine first information related to at least one door in the room;
displaying, based on the first information, a panoramic identifier of the at least one door in the panoramic image, the panoramic identifier indicating at least a door outline, a door type and an opening type of the door,
performing structure detection on the panoramic image to determine second information related to a plurality of structural planes of the room;
generating, based on the second information, a two-dimensional plan view of the room; and
displaying, based on the first information and the second information, a plan identifier of the at least one door in the two-dimensional plan view, the plan identifier indicating at least a two-dimensional door representation, the door type and the opening type of the door,
wherein generating the two-dimensional plan view of the room includes generating, based on the second information, a three-dimensional representation of the room in a three-dimensional spatial coordinate system; and converting the three-dimensional representation into a two-dimensional planar coordinate system to generate the two-dimensional plan view of the room, and wherein displaying the plan identifier of the at least one door in the two-dimensional plan view includes vertically projecting, based on the first information and the second information, the two-dimensional door representation of the door onto an edge in the two-dimensional plan view of the room to which a corresponding structural plane corresponds, to generate a substitute two-dimensional representation of the door; and displaying the substitute two-dimensional representation as the two-dimensional door representation of the door in the two-dimensional plan view.

2. The image processing method as claimed in claim 1, further comprising:

determining, based on the first information and the second information, a distance between a representative point of the door and a corresponding structural plane, before displaying the panoramic identifier of the door in the panoramic image or displaying the plan identifier of the door in the two-dimensional plan view; and removing a door whose distance does not meet a threshold range from the at least one door.

3. The image processing method as claimed in claim 1, wherein the panoramic identifier or the plan identifier of the door further indicates room types of rooms on both sides of the door.

4. The image processing method as claimed in claim 1, wherein the door detection and the structure detection are performed using a deep learning-based neural network.

5. The image processing method as claimed in claim 4, wherein the deep learning-based neural network is trained using a plurality of sample panoramic images, the plurality of sample panoramic images are generated by performing spatial transformation on the panoramic image, and the plurality of sample panoramic images have different viewpoint angles from the panoramic image.

6. An image processing method, comprising:

obtaining a plurality of panoramic images to which a plurality of rooms of a building respectively correspond;

performing door detection on each of the plurality of panoramic images to determine first information related to at least one door in the respective rooms;

performing structure detection on each of the plurality of panoramic images to determine second information related to a plurality of structural planes of the respective rooms;

generating, based on the first information and the second information, a plurality of room plan views to which the respective rooms of the building respectively correspond, each of the plurality of room plan views including an identifier of the at least one door in the room, and the identifier indicating at least one of a door representation, a door type, an opening type of the door, and room types of rooms on both sides of the door;

performing, based on the identifiers of the plurality of room plan views, matching of the doors between the plurality of rooms to determine matched door candidates performing structure detection on the panoramic image to determine second information related to a plurality of structural planes of the room:

generating, based on the second information, a two-dimensional plan view of the room; and displaying, based on the first information and the second information, a plan identifier of the at least one door in the two-dimensional plan view, the plan identifier indicating at least a two-dimensional door representation, the door type and the opening type of the door, wherein generating the two-dimensional plan view of the room includes generating, based on the second information, a three-dimensional representation of the room in a three-dimensional spatial coordinate system; and converting the three-dimensional representation into a two-dimensional planar coordinate system to generate the two-dimensional plan view of the room, and wherein displaying the plan identifier of the at least one door in the two-dimensional plan view includes vertically projecting, based on the first information and the second information, the two-dimensional door representation of the door onto an edge in the two-dimensional plan view of the room to which a corresponding structural plane corresponds, to generate a substitute two-dimensional representation of the door; and displaying the substitute two-dimensional representation as the two-dimensional door representation of the door in the two-dimensional plan view.

7. The image processing method as claimed in claim 6, further comprising:

stitching, based on the matched door candidates, the plurality of room plan views to generate an architectural plan view of the building.

8. An image processing apparatus, comprising:

a memory storing computer-executable instructions; and one or more processors configured to execute the computer-executable instructions such that the one or more processors are configured to obtain a panoramic image to which a room corresponds;

perform door detection on the panoramic image to determine first information related to at least one door in the room;

display, based on the first information, a panoramic identifier of the at least one door in the panoramic image, the panoramic identifier indicating at least a door outline, a door type and an opening type of the door, perform structure detection on the panoramic image to determine second information related to a plurality of structural planes of the room;

generate, based on the second information, a two-dimensional plan view of the room; and display, based on the first information and the second information, a plan identifier of the at least one door in the two-dimensional plan view, the plan identifier indicating at least a two-dimensional door representation, the door type and the opening type of the door, wherein the one or more processors are configured to generate, based on the second information, a three-dimensional representation of the room in a three-dimensional spatial coordinate system; and convert the three-dimensional representation into a two-dimensional planar coordinate system to generate the two-dimensional plan view of the room, and wherein the one or more processors are configured to vertically project, based on the first information and the second information, the two-dimensional door representation of the door onto an edge in the two-dimensional plan view of the room to which a corresponding structural plane corresponds, to generate a substitute two-dimensional representation of the door; and display the substitute two-dimensional representation as the two-dimensional door representation of the door in the two-dimensional plan view.

9. The image processing apparatus as claimed in claim 8, wherein the one or more processors are further configured to determine, based on the first information and the second information, a distance between a representative point of the door and a corresponding structural plane, before displaying the panoramic identifier of the door in the panoramic image or displaying the plan identifier of the door in the two-dimensional plan view; and remove a door whose distance does not meet a threshold range from the at least one door.

10. The image processing apparatus as claimed in claim 8, wherein the panoramic identifier or the plan identifier of the door further indicates room types of rooms on both sides of the door.

11. The image processing apparatus as claimed in claim 8, wherein the door detection and the structure detection are performed using a deep learning-based neural network.

12. The image processing apparatus as claimed in claim 11, wherein the deep learning-based neural network is trained using a plurality of sample panoramic images, the plurality of sample panoramic images are generated by performing spatial transformation on the panoramic image, and the plurality of sample panoramic images have different viewpoint angles from the panoramic image.

* * * * *